United States Patent
Zhou et al.

(10) Patent No.: US 12,228,715 B2
(45) Date of Patent: Feb. 18, 2025

(54) OPTICAL SYSTEM AND DISPLAY APPARATUS

(71) Applicant: BOE TECHNOLOGY GROUP CO., LTD., Beijing (CN)

(72) Inventors: Zhenxing Zhou, Beijing (CN); Tao Hong, Beijing (CN); Haoran Jing, Beijing (CN); Gaoming Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 663 days.

(21) Appl. No.: 17/607,778

(22) PCT Filed: Dec. 25, 2020

(86) PCT No.: PCT/CN2020/139191
§ 371 (c)(1),
(2) Date: Oct. 29, 2021

(87) PCT Pub. No.: WO2022/133968
PCT Pub. Date: Jun. 30, 2022

(65) Prior Publication Data
US 2022/0397750 A1 Dec. 15, 2022

(51) Int. Cl.
*G02B 17/08* (2006.01)
*G02B 27/28* (2006.01)
*G02B 30/25* (2020.01)

(52) U.S. Cl.
CPC ....... *G02B 17/0856* (2013.01); *G02B 27/285* (2013.01); *G02B 30/25* (2020.01)

(58) Field of Classification Search
CPC .. G02B 17/0856; G02B 27/285; G02B 30/25; G02B 17/086; G02B 27/0172; G02B 2027/0185
See application file for complete search history.

(56) References Cited

U.S. PATENT DOCUMENTS

| | | | |
|---|---|---|---|
| 10,989,927 B2 * | 4/2021 | Lanman | G02B 27/0093 |
| 2014/0293434 A1 * | 10/2014 | Cheng | H04N 13/363 |
| | | | 359/630 |

(Continued)

FOREIGN PATENT DOCUMENTS

| | | |
|---|---|---|
| CN | 102402005 A | 4/2012 |
| CN | 102782562 A | 11/2012 |

(Continued)

*Primary Examiner* — Mustak Choudhury
(74) *Attorney, Agent, or Firm* — IP & T GROUP LLP

(57) ABSTRACT

An optical system includes at least one first display module, at least one second display module, and a first optical element. The first optical element includes a first light incident surface, a second light incident surface, and a viewing surface. The first light incident surface is configured to transmit imaging light emitted from the at least one first display module into the first optical element and refract it onto the second light incident surface. The second light incident surface is configured to transmit imaging light emitted from the at least one second display module into the first optical element and refract it onto the viewing surface, and reflect the imaging light transmitted into the first optical element through the first light incident surface onto the viewing surface. The viewing surface is configured to transmit the imaging light emitted from all display modules to a human eye.

18 Claims, 7 Drawing Sheets

(56) References Cited

U.S. PATENT DOCUMENTS

| | | |
|---|---|---|
| 2016/0085074 A1 | 3/2016 | Cheng et al. |
| 2019/0064526 A1* | 2/2019 | Connor ................ G02B 6/0073 |
| 2020/0096766 A1 | 3/2020 | Tang et al. |
| 2021/0302746 A1 | 9/2021 | Gao et al. |

FOREIGN PATENT DOCUMENTS

| | | |
|---|---|---|
| CN | 108957750 A | 12/2018 |
| CN | 110426853 A | 11/2019 |
| JP | 2020-012985 A | 1/2020 |

\* cited by examiner

OPTICAL SYSTEM AND DISPLAY APPARATUS

CROSS-REFERENCE TO RELATED APPLICATION

This application is a national phase entry under 35 USC 371 of International Patent Application No. PCT/CN2020/139191, filed on Dec. 25, 2020, which is incorporated herein by reference in its entirety.

TECHNICAL FIELD

The present disclosure relates to the field of display technologies, and in particular, to an optical system, and a display apparatus.

BACKGROUND

With the development of display technologies, display apparatus such as virtual reality (VR) display apparatus and augmented reality (AR) display apparatus have been widely recognized by users and attracted extensive attention in industries.

SUMMARY

In an aspect, an optical system is provided. The optical system includes at least one first display module, at least one second display module, and a first optical element. The first optical element includes a first light incident surface, a second light incident surface, and a viewing surface. The first light incident surface is disposed on a light exit path of the at least one first display module, and the second light incident surface is disposed on a light exit path of the at least one second display module. The first light incident surface is configured to transmit imaging light emitted from the at least one first display module into the first optical element and refract the imaging light emitted from the at least one first display module onto the second light incident surface. The second light incident surface is configured to transmit imaging light emitted from the at least one second display module into the first optical element and refract the imaging light emitted from the at least one second display module onto the viewing surface, and reflect the imaging light, which is transmitted into the first optical element through the first light incident surface, onto the viewing surface. The viewing surface is configured to transmit imaging light emitted from the at least one first display module and the at least one second display module to a human eye, so as to form virtual images on different focal planes at a side of the viewing surface away from the human eye.

In some embodiments, at least one of the first light incident surface, the second light incident surface, and the viewing surface is a free-form surface.

In some embodiments, the first optical element includes a first free-form surface prism, and the first light incident surface, the second light incident surface, and the viewing surface are three surfaces of the first free-form surface prism.

In some embodiments, the optical system further includes a second optical element. The second optical element includes a third light incident surface and a first light exit surface. The third light incident surface is disposed on a light exit path of a first second display module in the at least one second display module, and the first light exit surface is disposed opposite to the second light incident surface of the first optical element. The third light incident surface is configured to transmit imaging light emitted from the first second display module into the second optical element and directly or indirectly transmit the imaging light emitted from the first second display module onto the first light exit surface. The first light exit surface is configured to transmit imaging light incident onto the first light exit surface in the second optical element onto the second light incident surface of the first optical element.

In some embodiments, the second optical element further includes a fourth light incident surface, and the fourth light incident surface is configured to reflect the imaging light, which is transmitted into the second optical element through the third light incident surface, onto the first light exit surface.

In some embodiments, the at least one second display module further includes a second second display module, and the fourth light incident surface is disposed on a light exit path of the second second display module. The fourth light incident surface is further configured to transmit imaging light emitted from the second second display module into the second optical element and refract the imaging light emitted from the second second display module onto the first light exit surface.

In some embodiments, at least one of the third light incident surface, the fourth light incident surface, and the first light exit surface is a free-form surface.

In some embodiments, the second optical element includes a second free-form surface prism, and the third light incident surface, the fourth light incident surface, and the first light exit surface are three surfaces of the second free-form surface prism.

In some embodiments, the optical system further includes a third optical element and/or a fourth optical element. The third optical element is disposed on a light exit path of a first first display module in the at least one first display module, and the third optical element includes a fifth light incident surface, a first dimming surface and a second light exit surface. The fifth light incident surface is configured to transmit imaging light emitted from the first first display module into the third optical element; the first dimming surface is configured to reflect the imaging light, which is transmitted into the third optical element through the fifth light incident surface, onto the second light exit surface; and the second light exit surface is configured to transmit the imaging light reflected by the first dimming surface onto the first light incident surface of the first optical element. The fourth optical element is disposed on a light exit path of the first second display module, and the fourth optical element includes a sixth light incident surface, a second dimming surface and a third light exit surface. The sixth light incident surface is configured to transmit the imaging light emitted from the first second display module into the fourth optical element; the second dimming surface is configured to reflect the imaging light, which is transmitted into the fourth optical element through the sixth light incident surface, onto the third light exit surface; and the third light exit surface is configured to transmit the imaging light reflected by the second dimming surface onto the third light incident surface of the second optical element.

In some embodiments, the first dimming surface is arranged in at least one of following ways: a total reflection angle at the first dimming surface being smaller than or equal to a first preset angle, the first preset angle being configured to cause the imaging light incident on the first dimming surface to be totally reflected; or, the first dimming surface being a reflective mirror surface. The second dimming surface is arranged in at least one of following ways: a total reflection angle at the second dimming surface being smaller than or equal to a second preset angle, the second preset angle being configured to cause the imaging light incident on the second dimming surface to be totally reflected; or, the second dimming surface being the reflective mirror surface.

In some embodiments, the first light exit surface of the second optical element is in contact with the second light incident surface of the first optical element; or, the first light exit surface of the second optical element and the second light incident surface of the first optical element have a gap therebetween.

In some embodiments, the optical system further includes a polarization beam splitter, at least one first polarization assembly, and at least one second polarization assembly. Each first polarization assembly is disposed on a light exit side of one corresponding first display module, and the first polarization assembly is configured to modulate imaging light emitted from the corresponding first display module into imaging light in a first polarization state. Each second polarization assembly is disposed on a light exit side of one corresponding second display module, and the second polarization assembly is configured to modulate imaging light emitted from the corresponding second display module into imaging light in a second polarization state. The polarization beam splitter is disposed between the second light incident surface of the first optical element and the first light exit surface of the second optical element, and the polarization beam splitter is configured to reflect the imaging light in the first polarization state, and transmit the imaging light in the second polarization state.

In some embodiments, a ratio of a reflectance to a transmittance of the second light incident surface is N to 1 (N:1), and a ratio of display brightness of a first display module to display brightness of a second display module is 1 to N (1:N). N is greater than 0.

In some embodiments, the second optical element further includes a fourth light incident surface, and the at least one second display module further includes a second second display module. The optical system further includes a fifth optical element. The fifth optical element is disposed on a light exit path of the second second display module. The fifth optical element includes a seventh light incident surface and a fourth light exit surface. The seventh light incident surface is configured to transmit imaging light emitted from the second second display module into the fifth optical element. The fourth light exit surface is configured to transmit the imaging light transmitted through the seventh light incident surface onto the fourth light incident surface of the second optical element. The fourth light incident surface is further configured to transmit the imaging light transmitted through the fourth light exit surface into the second optical element and refract the imaging light transmitted through the fourth light exit surface onto the first light exit surface.

In some embodiments, the imaging light emitted from each display module of the at least one first display module and the at least one second display module has different optical paths to the viewing surface.

In another aspect, a display apparatus is provided. The display apparatus includes the optical system according to any one of the above embodiments.

In some embodiments, the apparatus includes virtual reality glasses or augmented reality glasses.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1:
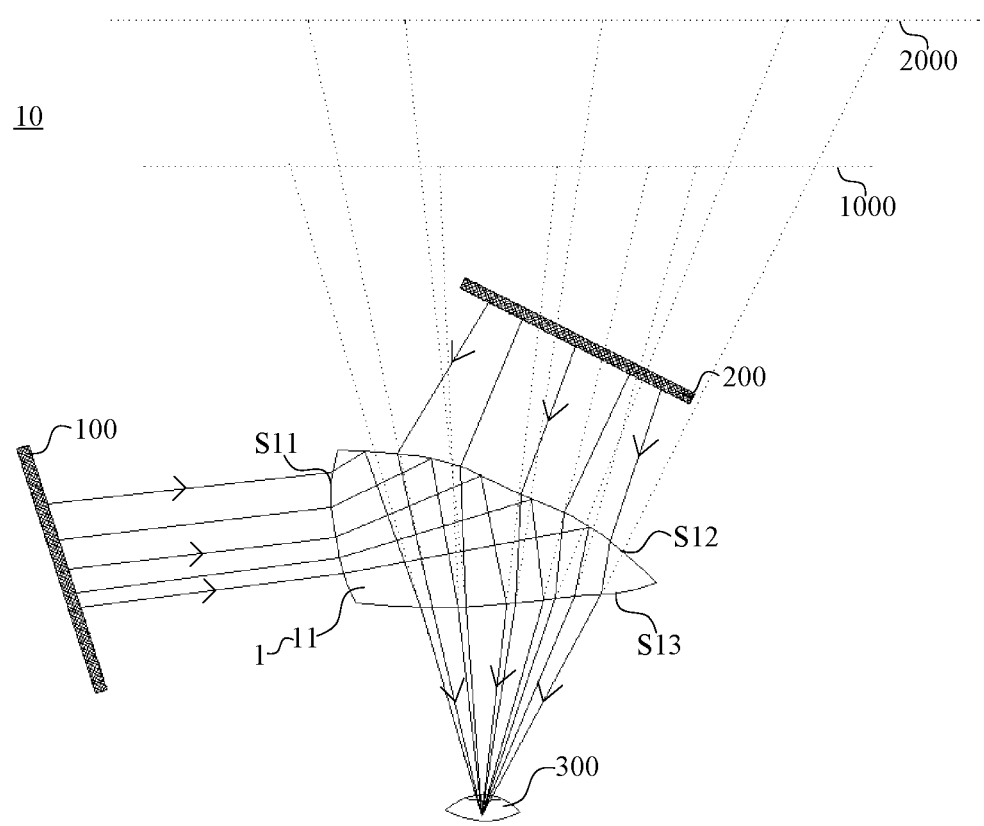
FIG. 1 is a diagram showing a structure of a optical system, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained based on the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily to refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only, and are not to be construed as indicating or implying relative importance or implicitly indicating the number of indicated technical features. Thus, a feature defined by "first" or "second" may explicitly or implicitly include one or more of the features. In the description of the embodiments of the present disclosure, the term "a plurality of" or "the plurality of" means two or more unless otherwise specified.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of the phrase "applicable to" or "configured to" herein means an open and inclusive language, which does not exclude devices that are applicable to or configured to perform additional tasks or steps.

In addition, the use of the phrase "based on" herein is meant to be open and inclusive, since a process, step, calculation or other action that is "based on" one or more of the stated conditions or values may, in practice, be based on additional conditions or values exceeding those stated.

The term such as "about" or "approximately" as used herein includes a stated value and an average value within an acceptable range of deviation of a particular value. The acceptable range of deviation is determined by a person of ordinary skill in the art in view of the measurement in question and the error associated with the measurement of a particular quantity (i.e., limitations of a measurement system).

Virtual reality (VR) display apparatuses are widely loved by people due to their advantages of immersion, interaction and imagination. Augmented reality (AR) display apparatuses superimposes the displayed virtual scene image on the external real scene, so as to realize a fusion of the external real scene and the virtual scene, and therefore, the user's cognitive abilities of the real world may be improved. In the related art, the virtual reality display apparatuses and the augmented reality display apparatuses mostly use binocular parallax to produce 3D (three-dimension) display effects. In this way, two eyeballs of the user focus on virtual images with fixed distances respectively, but cannot refocus with the distance of the displayed virtual object. The presented distances are different due to binocular parallax and focus blur, so that the brain generally produces depth perception conflicts, which may cause visual fatigue and convergence conflicts.

Base on this, some embodiments of the present disclosure provide an optical system 10. The optical system may be applied to, for example, the VR display apparatus or the AR display apparatus. Referring to FIGS. 1 to 8, the optical system includes at least one first display module 100 and at least one second display module 200. During a display process, all the display modules (e.g., the first display module 100 and the second display module 200) may be used to display images at different imaging depth under a same scene. For example, the first display module 100 may display an image with clear near objects and blurred distant objects, and the second display module 200 may display an image with blurred near objects and clear distant objects. Alternatively, the first display module 100 may display an image with blurred near objects and clear distant objects, and the second display module 200 may display an image with clear near objects and blurred distant objects.

The display module may be any display device with a display function, such as an LCD (liquid crystal display), an OLED (organic light emitting diode) display, or a QLED (quantum dot light emitting diode) display.

With continued reference to FIGS. 1 to 8, the optical system 10 further includes a first optical element 1. The first optical element 1 includes a first light incident surface S11, a second light incident surface S12, and a viewing surface S13.

The first light incident surface S11 is disposed on a light exit path of the at least one first display module 100. The first light incident surface S11 is configured to transmit imaging light emitted from the at least one first display module 100 into the first optical element 1 and refract the imaging light emitted from the at least one first display module onto the second light incident surface S12.

For example, the first light incident surface S11 may be disposed opposite to the light exit surface of the at least one first display module 100, so that optical paths of the imaging light emitted from different positions of the first display module 100 to the first light incident surface S11 are relatively consistent. As a result, the imaging light emitted from the first display module 100 may be modulated easily. In addition, during the display process of the first display module 100, since the imaging light emitted from the display module is concentrated when it is in a light exit angle range in which the imaging light tends to be perpendicular to a surface of the display module, a light exit amount in the light exit angle range is greater than that in other angles.

The "tending to be perpendicular" may mean that an angle between the light emitted from the display module and the surface of the display module ranges from 85 to degrees to 95 degrees. The light exit angle may be 85 degrees, 87 degrees, 90 degrees, 92 degrees, 95 degrees, etc. In this way, the imaging light emitted from the first display module 100 may enter the first optical element 1 greatly, which is beneficial to improving a utilization ratio of the imaging light emitted from the first display module 100. As a result, brightness of 3D imaging may be further improved.

The first light incident surface S11 may be, for example, a free-form surface. Compared with rotationally symmetric surfaces such as a spherical surface and an aspherical surface, the free-form surface may not be restricted by a rotational symmetry axis, has a high freedom in design and a high freedom in surface shape, and has a strong control over light, so that the imaging light emitted from the first display module 100 may be well modulated, and may be refracted to the second light incident surface S12 stably and accurately. The free-form surface may be, for example, designed by using an xy polynomial. For example, the free-form surface includes a plurality of subsurfaces that are connected to each other, and the surface shape $z1(x, y)$ of the free-form surface meets an expression (1):

$$z1(x, y) = \frac{c1y^2}{1 + \sqrt{1 - (1+k1)c1^2y^2}} + \sum_{m=0}^{p}\sum_{n=0}^{p} Cmn1 \times x^m y^n \quad (1)$$

Wherein c1 is the radius of curvature of each of the plurality of subsurfaces; k1 is the quadric constant of each of the plurality of subsurfaces, and Cmn1 is the mth to nth order coefficient of each of the plurality of subsurfaces.

Of course, the free-form surface may also be designed by using, for example, Zernike polynomials or other expressions that may characterize a free-form surface, which is not limited in the present disclosure.

The second light incident surface S12 is disposed on a light exit path of the at least one second display module 200. The second light incident surface S12 is configured to transmit imaging light emitted from the at least one second display module 200 into the first optical element 1 and refract the imaging light emitted from the at least one second display module 200 onto the viewing surface S13, and reflect the imaging light, which is transmitted into the first optical element 1 through the first light incident surface S11, onto the viewing surface S13.

For example, the second light incident surface S12 may be disposed opposite to the light exit surface of the at least one second display module 200. Similarly, in this way, the imaging light emitted from the second display module 200 may enter the first optical element 1 greatly, which is beneficial to improving a final effect of 3D imaging.

The second light incident surface S12 may be, for example, a free-form surface. In this way, the imaging light emitted from the first display module 100 and the second display module 200 may be well modulated, so that the imaging light emitted from the first display module 100 may be reflected to the viewing surface S13 stably, and the imaging light emitted from the second display module 200 may be refracted to the viewing surface S13 stably. A design principle of the free-form surface may be referred to the previous description, which will not be repeated here.

The viewing surface S13 is configured to transmit the imaging light emitted from all the display modules (for example, the at least one first display module 100 and the at least one second display module 200) to a human eye 300, so as to form virtual images on different focal planes (i.e., the imaging light emitted from the display modules may be converged to the human eye 300 through the viewing surface S13, and the virtual images perceived by the human eye 300 are respectively imaged on different focal planes) at a side of the viewing surface S13 away from the human eye 300. The viewing surface S13 may be, for example, a spherical surface, a manufacturing process of which is simple and the cost is low. The viewing surface S13 may also be, for example, an aspheric surface, which may focus off-axis light well and avoid viewing deformed and blurred images. The viewing surface S13 may still also be, for example, a free-form surface, which has a high freedom in design, and a strong ability to correct off-axis aberrations.

In some embodiments, the imaging light emitted from each display module (for example, the first display module 100 and the second display module 200) has different optical paths to the viewing surface S13, so that the virtual images corresponding to the display modules may be located on focal planes at different positions. As a result, a stable and effective 3D display effect may be formed.

It will be noted that the positions of the imaging focal planes corresponding to the display modules are not only determined by positions of the display modules, that is, the positions of the imaging focal planes corresponding to the display modules may also be determined by elements (such as surface shapes, thicknesses, refractive indexes of the optical elements, a material of a medium between adjacent optical elements, and a distance between adjacent optical elements, etc.) that are involved in the light exit paths of the display modules.

In the optical system 10 provided by some embodiments of the present disclosure, the imaging light emitted from the first display module 100 is reflected by the second light incident surface S12, the imaging light emitted from the second display module 200 is transmitted through the second light incident surface S12, the imaging light of the above display modules is finally transmitted to the human eye 300 through the viewing surface S13, and the virtual images perceived by the human eye 300 are respectively imaged on different focal planes (e.g., the imaging focal planes corresponding to the first display module 100 and the second display module 200 are respectively a first focal plane 1000 and a second focal plane 2000 in FIG. 1) at a side of the viewing surface S13 away from the human eye 300. The human eye 300 may receive a plurality of sets of images with different imaging depths under a same scene simultaneously, so that a stereoscopic image is generated and the 3D display effect is formed. In this case, since the human eye 300 may freely focus on images with different imaging depths under a same scene through the eyeball, details of objects at different distances may be simultaneously seen clearly. As a result, the convergence conflicts caused by the fixed focus position of the human eye 300 may be improved, and the human eye 300 is not prone to fatigue when watching the 3D images.

It will be noted that the human eye 300 may be a single eyeball. That is, a single eyeball may receive the imaging light from the plurality of different display modules (e.g., the first display module 100 and the second display module 200), so as to see the 3D display effect. When binocular viewing is required, each eyeball may correspond to a independent set of optical system. In this way, the convergence conflicts caused by the fixed focus position of the human eye 300 in the related art may be improved.

As shown in FIGS. 1 to 8, in some embodiments, the first optical element 1 includes a first free-form surface prism 11, and the first light incident surface S11, the second light incident surface S12, and the viewing surface S13 are three surfaces of the first free-form surface prism 11. For example, the first light incident surface S11, the second light incident surface S12, and the viewing surface S13 may be the three surfaces, which are sequentially connected end to end, of the first free-form surface prism 11. In this way, an overall structure of the first optical element 1 is simple, a occupied space is small, and the 3D imaging may be realized by using the single first free-form surface prism 11 and the plurality of display modules.

In some embodiments, referring to FIGS. 2 to 8, the optical system 10 further includes a second optical element 2. The second optical element 2 includes a third light incident surface S21 and a first light exit surface S23.

The third light incident surface S21 is disposed on a light exit path of a first second display module 201 in the at least one second display module 200. The third light incident surface S21 is configured to transmit imaging light emitted from the first second display module 201 into the second optical element 2 and directly or indirectly transmit the imaging light emitted from the first second display module 201 onto the first light exit surface S23.

Figure 2:
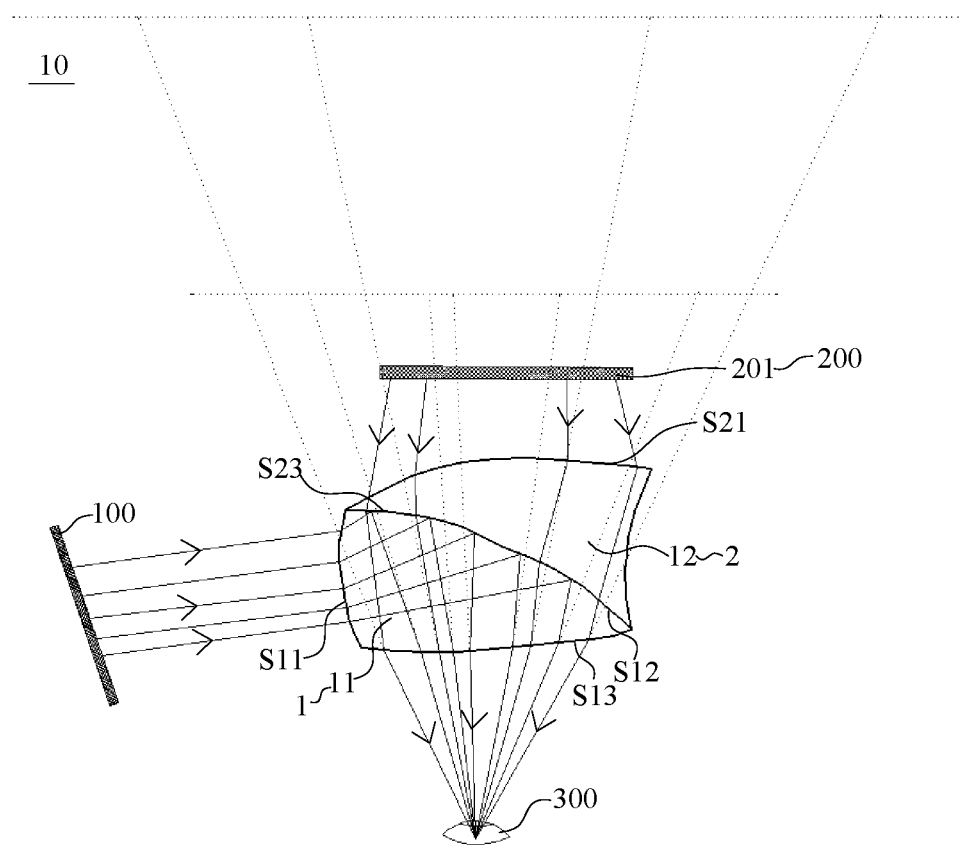
FIG. 2 is a diagram showing a structure of another optical system, in accordance with some embodiments.

As shown in FIG. 2, in some examples, the first light exit surface S23 is opposite to the second light incident surface S12 of the first optical element 1. The first light exit surface S23 is configured to transmit imaging light incident onto the first light exit surface S23 in the second optical element 2 onto the second light incident surface S12 of the first optical element 1. A specific path of the imaging light when being transmitted through the second optical element 2 is as follows: the imaging light is first transmitted onto the first light exit surface S23 through the third light incident surface S21, and then are incident onto the second light incident surface S12 of the first optical element 1 through the first light exit surface S23. In this way, the second optical element 2 may modulate the optical path of the imaging light emitted from the first second display module 201, so that the location of the first second display module 201 may be flexibly set.

It will be noted that a propagation path of the imaging light emitted from the first second display module 201 in the second optical element 2 may be flexibly set. Correspondingly, the shape and size of the second optical element 2 need to be changed accordingly. For example, at least one of the third light incident surface S21 and the first light exit surface S23 of the second optical element 2 is a free-form surface, and the design principle of the free-form surface may be referred to the previous description, which will not be repeated here. The free-form surface may flexibly change the propagation path of the imaging light. In this way, the optical path of the imaging light emitted from the first second display module 201 may be changed through the second optical element 2, so that the location of the first second display module 201 may be flexibly set.

Figure 3:
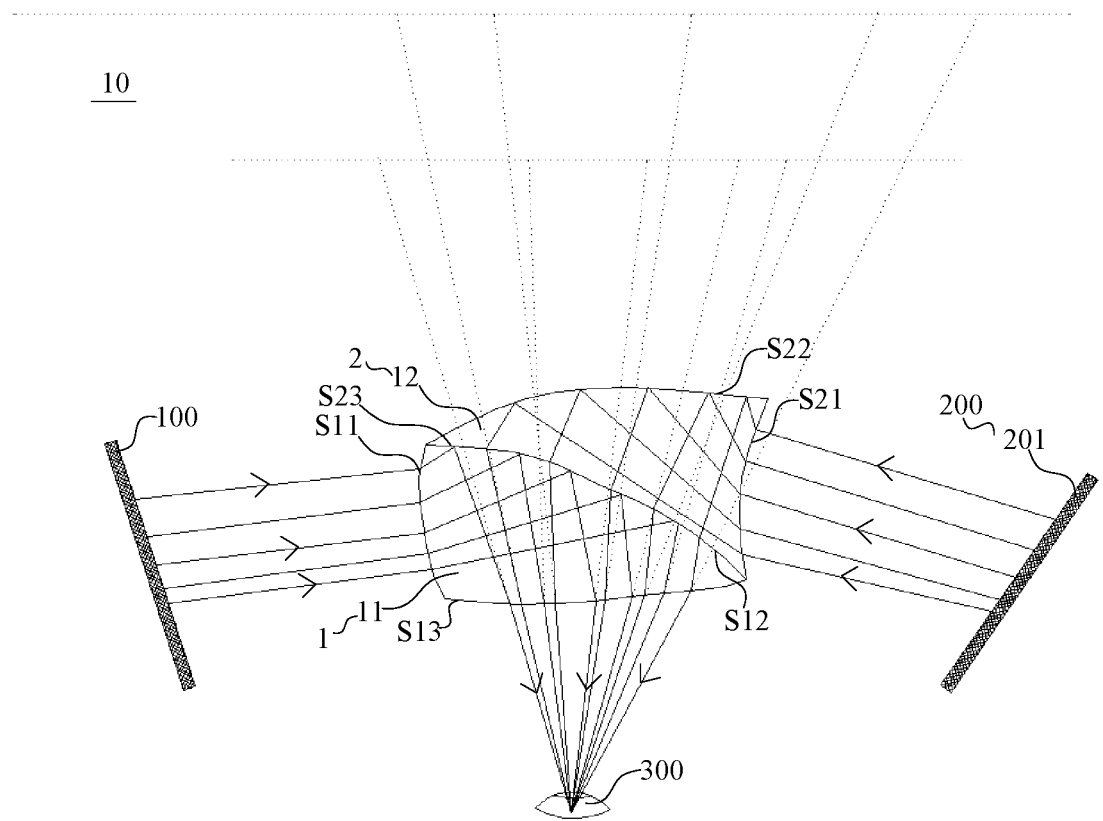
FIG. 3 is a diagram showing a structure of yet another optical system according to some embodiments.

As shown in FIG. 3, in some other examples, the second optical element 2 further includes a fourth light incident surface S22. The fourth light incident surface S22 is configured to reflect the imaging light, which is transmitted into the second optical element 2 through the third light incident surface S21, onto the first light exit surface S23. In this case, a path of the imaging light when being transmitted through the second optical element 2 is as follows: the imaging light is first transmitted onto the fourth light incident surface S22 through the third light incident surface S21, and then is reflected onto the first light exit surface S23 by the fourth light incident surface S22, and is transmitted out of the second optical element 2 afterwards. In this way, it is realized that the imaging light that is transmitted into the second optical element 2 through the third light-incident surface S21 is indirectly transmitted to the first light exit surface S23.

At least one of the fourth light incident surface S22, the third light incident surface S21, and the first light exit surface S23 is a free-form surface. For example, the second optical element 2 includes a second free-form surface prism 12, and the third light incident surface S21, the fourth light incident surface S22, and the first light exit surface S23 are three surfaces of the second free-form surface prism 12. For example, as shown in FIG. 3, the third light incident surface S21, the fourth light incident surface S22, and the first light exit surface S23 may be three surfaces, which are sequentially connected end to end, of the second free-form surface prism 12. In this way, an overall structure of the second optical element 2 is simple, and the free-form surface may form a good modulation of the light that is transmitted through the free-form surface, thereby increasing a proportion of the imaging light reaching the second light incident surface S12 of the first optical element 1, and finally enhancing the 3D display effect. The design principle of the free-form surface may be referred to the previous description, which will not be repeated here.

Figure 4:
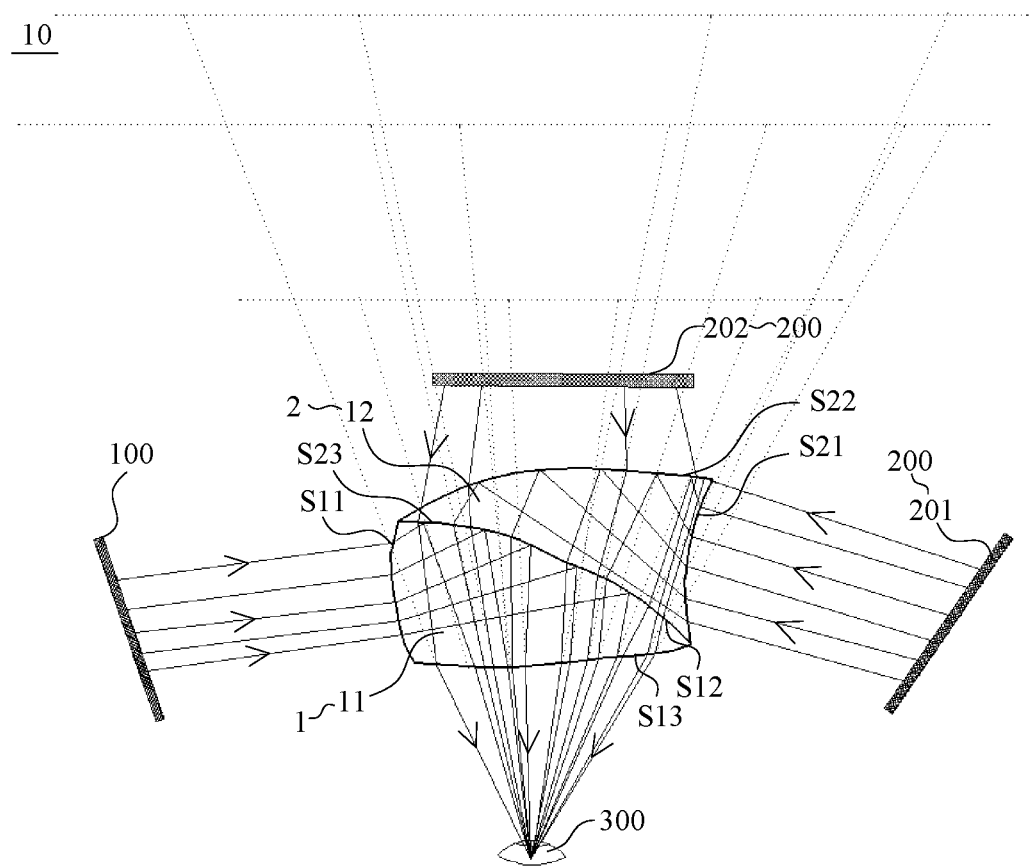
FIG. 4 is a diagram showing a structure of yet another optical system, in accordance with some embodiments.

As shown in FIG. 4, in yet other examples, the second optical element 2 further includes a second second display module 202 disposed opposite to the fourth light incident surface S22, and a display side of the first second display module 201 is disposed opposite to the third light incident surface S21. In this way, the imaging light emitted from the two second display modules 200 may both reach the second light incident surface S12 of the first optical element 1 through the second optical element 2. In this case, the imaging light emitted from the two second display modules 200 and one first display module 100 may finally reach the human eye 300 through the viewing surface S13, so that the human eye 300 may see the images on three focal planes. As a result, the 3D display effect may be improved.

At least one of the fourth light incident surface S22, the third light incident surface S21, and the first light exit surface S23 is a free-form surface. The design principle of the free-form surface may be referred to the previous description, which will not be repeated here.

Referring to FIGS. 2 to 4 and FIGS. 7 to 8, in some embodiments, the first light to exit surface S23 of the second optical element 2 is in contact with the second light incident surface S12 of the first optical element 1. In some examples, the first light exit surface S23 and the second light incident surface S12 are bonded by gluing. For example, the first light exit surface S23 and the second light incident surface S12 may be bonded with an optically clear adhesive. The optical elements after bonding has a good light transmission, low shrinkage and high stability, and the occupied space of the optical system 10 may also be reduced.

In some examples, the first optical element 1 and the second optical element 2 may use mediums with different refractive indexes. For example, the first optical element 1 may use a first free-form surface prism made of polycarbonate (PC), and the second optical element 2 may use a second free-form surface prism made of polymethyl methacrylate (PMMA). In this case, the refractive index of the second optical element 2 may be, for example, 1.49, and the refractive index of the first optical element 1 may be, for example, 1.65.

Since the imaging light includes three primary colors of light (e.g., red light, green light and blue light), when the imaging light is transmitted through an optical element of a single optical material, dispersion is prone to occur. And the larger an Abbe number of the optical material is, the more obvious the dispersion will be. By using a concave surface and a convex surface respectively corresponding to the first light exit surface S23 and the second light incident surface S12, in cooperation with the corresponding different refractive indexes of the second optical element 2 and the first optical element 1, it is possible to effectively reduce chromatic aberration generated when the imaging light is transmitted through the optical elements of a single optical material. As a result, the final 3D display effect may be improved.

Figure 5:
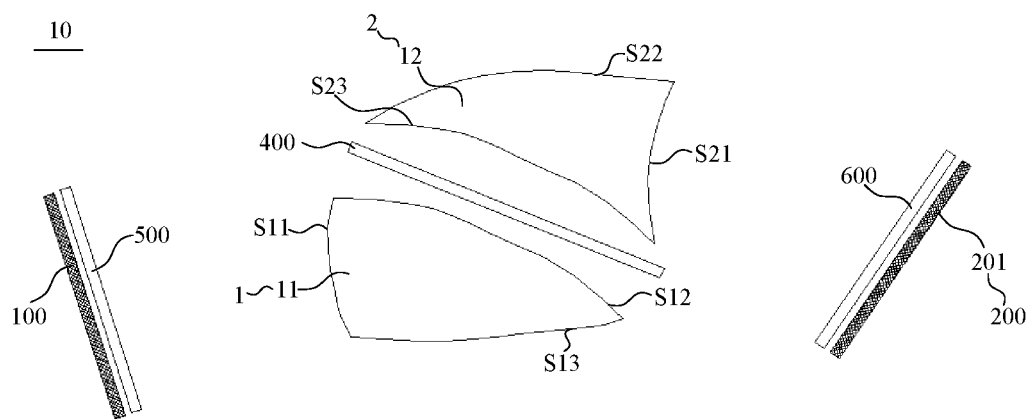
FIG. 5 is a diagram showing a structure of yet another optical system, in accordance with some embodiments.

Referring to FIG. 5, in some other embodiments, the first light exit surface S23 of the second optical element 2 and the second light incident surface S12 of the first optical element 1 have a gap therebetween. Since air exists in the gap between the second optical element 2 and the first optical element 1, there are medium differences between the second optical element 2 and the air in the gap and between the first optical element 1 and the air in the gap, so that a modulation performance of the optical path of the imaging light may be improved, and the final 3D display effect may be enhanced. In addition, the second optical element 2 is separate from the first optical element 1, so that the glue may be avoided and a production cost may be reduced.

During a process in which the imaging light transmitted out of the second optical element 2 is transmitted through the second light incident surface S12 of the first optical element 1, part of the imaging light may be reflected by the second light incident surface S12 and then enter the second optical element 2 again to form stray light after multiple reflection. In addition, during a process in which the imaging light in the first optical element 1 refracted to the second light incident surface S12 is reflected, part of the imaging light may be transmitted and enter the second optical element 2 to form stray light after multiple reflection.

Based on this, as shown in FIG. 5, in some embodiments, the optical system 10 further includes at least one first polarization assembly 500, at least one second polarization assembly 600 and a polarization beam splitter 400.

Each first polarization assembly 500 is disposed on a light exit side of one corresponding first display module 100, and the first polarization assembly 500 is configured to modulate the imaging light emitted from the corresponding first display module 100 into imaging light in a first polarization state. Each second polarization assembly 600 is disposed on a light exit side of one corresponding second display module 200, and the second polarization assembly 600 is configured to modulate the imaging light emitted from the corresponding second display module 200 into imaging light in a second polarization state. The imaging light in the first polarization state and the imaging light in the second polarization state may be, for example, two sets of linearly polarized light that are perpendicular to each other. The two sets of linearly polarized light do not interfere with each other, which is convenient for subsequent targeted reception and utilization.

The polarization beam splitter 400 is disposed between the second light incident surface S12 of the first optical element 1 and the first light exit surface S23 of the second optical element 2, and the polarization beam splitter 400 is configured to reflect the imaging light in the first polarization state, and transmit the imaging light in the second polarization state. Natural light emitted from the first display module 100 and the second display module 200 form two sets of linearly polarized light that do not interfere with each other after being polarized by corresponding polarization assemblies, and after targeted transmission and reflection of the polarization beam splitter 400, the two sets of linearly polarized light finally enters the human eye. There is no interference between the two sets of linearly polarized light, and an influence of the stray light may be also reduced. As a result, the 3D display effect may be improved.

In some examples, the imaging light in the first polarization state may be S-polarized light, and the imaging light in the second polarization state may be P-polarized light. In this case, the first polarization assembly 500 may include an S-polarizer, and the second polarization assembly 600 may include a P-polarizer. In some other examples, the imaging light in the first polarization state may be P-polarized to light, and the imaging light in the second polarization state may be S-polarized light. In this case, the first polarization assembly 500 may include a P-polarizer, and the second polarization assembly 600 may include an S-polarizer.

Figure 6:
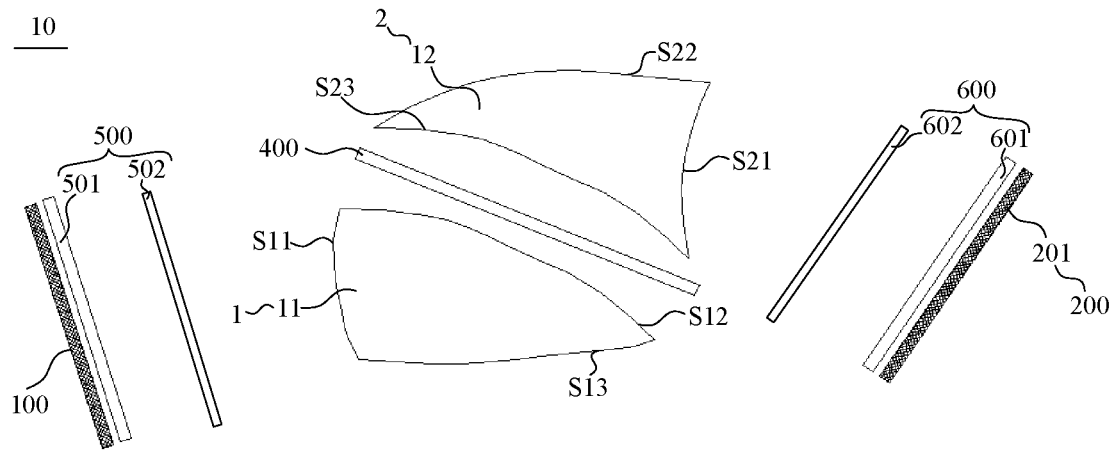
FIG. 6 is a diagram showing a structure of yet another optical system, in accordance with some embodiments.

In some embodiments, as shown in FIG. 6, the first polarization assembly 500 includes a first polarizer 501 and a first half-wave plate 502 that are sequentially away from the first display module 100. The first polarizer 501 is parallel to the first display module 100, and the first polarizer is configured to modulate the imaging light emitted from the first display module into the imaging light in the second polarization state. An angle between a fast axis of the first half-wave plate 502 and a transmission axis of the first polarizer is approximately 45 degrees. The first half-wave plate is configured to convert the imaging light in the second polarization state modulated by the first polarizer into the imaging light in the first polarization state. In this case, if the imaging light in the first polarization state is S-polarized light, and the imaging light in the second polarization state is P-polarized light, then the first polarizer 501 may be a P-polarizer; if the imaging light in the first polarization state is P-polarized light, and the imaging light in the second polarization state is S-polarized light, then the first polarizer 501 may be an S-polarizer.

And/or, the second polarization assembly 600 includes a second polarizer 601 and a second half-wave plate 602 that are sequentially away from the second display module 200. The second polarizer 601 is configured to modulate the imaging light emitted from the second display module into the imaging light in the first polarization state, and the second polarizer 601 is parallel to the second display module 200. An angle between a fast axis of the second half-wave plate 602 and a transmission axis of the second polarizer is approximately 45 degrees. The second half-wave plate is configured to convert the imaging light in the first polarization state modulated by the second polarizer into the imaging light in the second polarization state. In this case, if the imaging light in the first polarization state is S-polarized light, and the imaging light in the second polarization state is P-polarized light, then the second polarizer 601 may be an S-polarizer; if the imaging light in the first polarization state is P-polarized light, and the imaging light in the second polarization state is S-polarized light, then the second polarizer 601 may be a P-polarizer.

The half-wave plate may modulate the imaging light in a polarization state generated by the polarization assemblies and convert it into imaging light in a required polarization state.

It will be noted that the "parallel" refers to parallel or approximately parallel. When the first polarizer 501 and the first half-wave plate 502 (or the second polarizer 601 and the second half-wave plate 602) are parallel, there is no contact between planes of the two. When the first polarizer 501 and the first half-wave plate 502 are approximately parallel, there may be an included angle between the planes of the two, and the included angle may be greater than 0 degree and less than or equal to 5 degrees. The included angle may be, for example, 0 degree, 2 degrees, 4 degrees, 5 degrees, etc. In addition, "approximately 45 degrees" may refer to a stated value (ie, 45 degrees), or may also mean values that are close to the stated value. For example, the angle between the fast axis of the first half-wave plate 502 and the transmission axis of the first polarizer 501 (or between the fast axis of the second half-wave plate 602 and the transmission axis of the second polarizer 601) may be 42 degrees to 48 degrees. For example, the angle between the fast axis of the first half-wave plate 502 and the transmission axis of the first polarizer 501 (or between the fast axis of the second half-wave plate 602 and the transmission axis of the second polarizer 601) may be 42 to degrees, 43 degrees, 45 degrees, 47 degrees, 48 degrees, etc.

In some embodiments, a ratio of a reflectance to a transmittance of the second light incident surface S12 may be N to 1 (N:1). N is greater than 0. For example, N may be 1. In this case, the first optical element 1 may be a semi-reflection mirror, which has relatively little manufacture difficulty.

The imaging light emitted from the second display module 200 will be subject to a relatively great reflection effect when being transmitted through the second light incident surface S12, in this case, a ratio of display brightness of the first display module 100 to display brightness of the second display module 200 may be 1 to N (1:N). In this way, after some loss when being transmitted through the second light incident surface S12 (without considering loss on other surfaces of the first optical element 1 and the second optical element 2), the imaging light, emitted from the first display module 100 and the second display module 200, finally reaching the human eye 300 has a approximately same brightness, so that the 3D display effect may be ensured.

Figure 7:
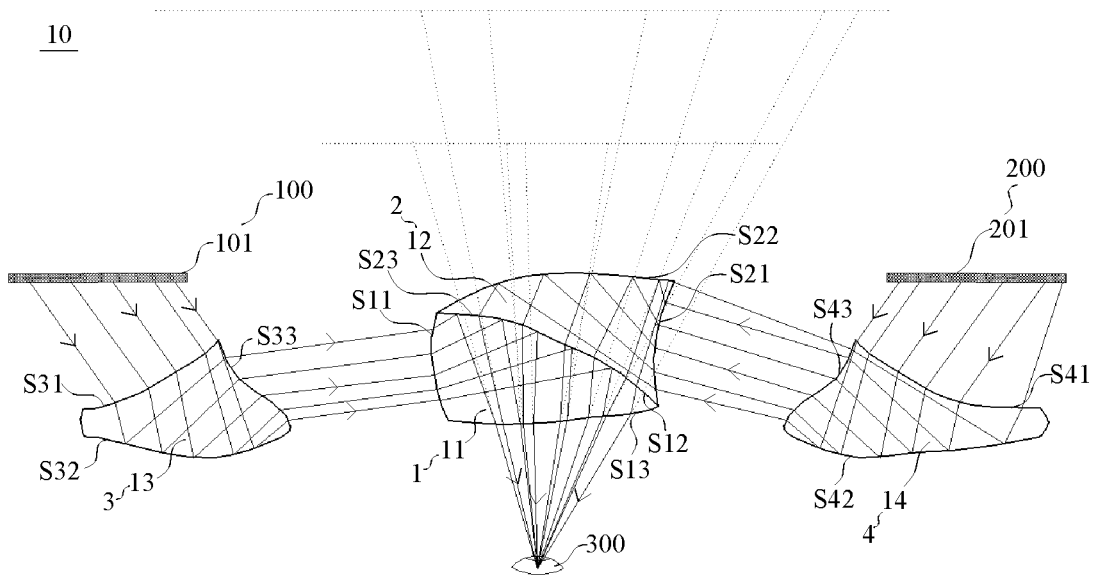
FIG. 7 is a diagram showing a structure of yet another optical system, in accordance with some embodiments.
Figure 8:
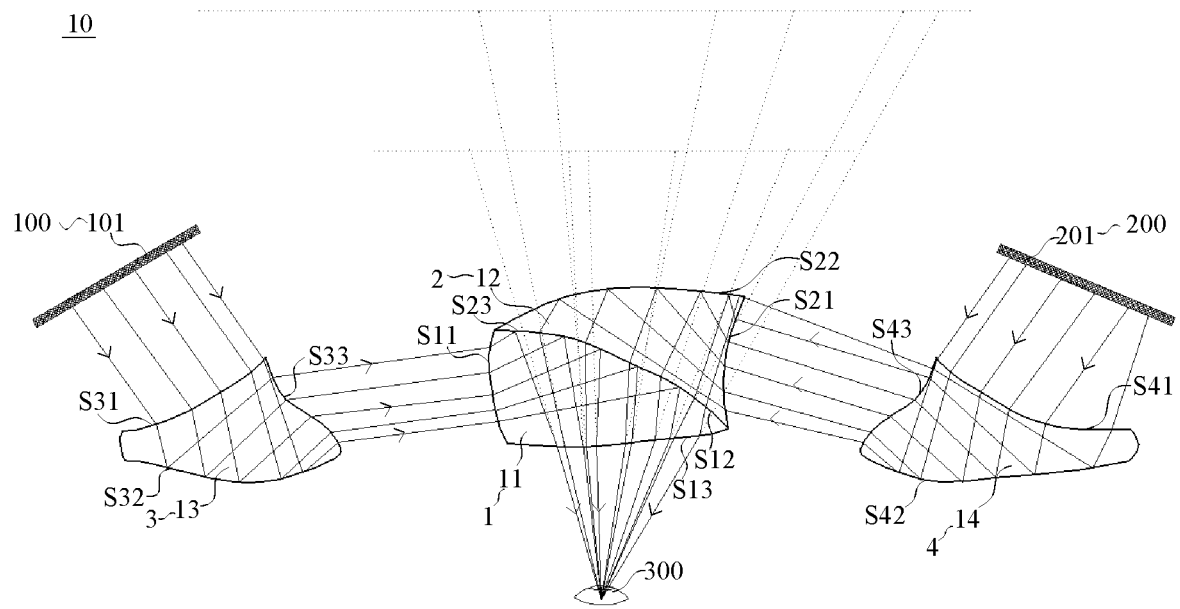
FIG. 8 is a diagram showing a structure of yet another optical system, in accordance with some embodiments.

In some embodiments, as shown in FIGS. 7 and 8, the optical system 10 further includes a third optical element 3 and/or a fourth optical element 4.

The third optical element 3 is disposed on a light exit path of a first first display module 101 in the at least one first display module 100. The third optical element 3 includes a fifth light incident surface S31, a first dimming surface S32 and a second light exit surface S33. The fifth light incident surface S31 is configured to transmit imaging light emitted from the first first display module 101 into the third optical element 3. The first dimming surface S32 is configured to reflect the imaging light, which is transmitted into the third optical element 3 through the fifth light incident surface S31, onto the second light exit surface S33. The second light exit surface S33 is configured to transmit to the imaging light reflected by the first dimming surface S32 onto the first light incident surface S11 of the first optical element 1. In this way, the light path of the imaging light emitted from the first first display module 101 may be modulated, so that the location of the first first display module 101 be flexibly set.

In some examples, at least one of the fifth light incident surface S31, the first dimming surface S32, and the second light exit surface S33 is a free-form surface. That is, any one or two of the fifth light incident surface S31, the first dimming surface S32, and the second light exit surface S33 are free-form surfaces, or all the three are free-form surfaces. For example, the third optical element 3 includes a third free-form surface prism 13, and the fifth light incident surface S31, the first dimming surface S32, and the second light exit surface S33 are three surfaces of the third free-form surface prism 13. For example, the fifth light incident surface S31, the first dimming surface S32, and the second light exit surface S33 may be three surfaces, which are sequentially connected end to end, of the third free-form surface prism 13. In this way, each surface of the third free-form surface prism 13 may be fully utilized, and the free-form surface may form a good modulation of the imaging light that is transmitted through the free-form surface, thereby improving a proportion of the imaging light that is emitted from the first first display module 101 and enters the first optical element 1 and the human eye 300, and finally enhancing the 3D display effect. The design principle of the free-form surface may be referred to the previous description, which will not be repeated here.

In some examples, the first dimming surface S32 may be a reflective mirror surface. Light is completely reflected when being incident on the reflective mirror surface from different incident angles. In this way, the imaging light emitted from the first first display module 101 may be completely reflected when being transmitted through the first to dimming surface S32, which may avoid excessive loss of the imaging light in the third optical element 3.

In some other examples, the first dimming surface S32 may also be set such that a total reflection angle at the first dimming surface S32 is smaller than a first preset angle, and the first preset angle is configured to cause the imaging light incident on the first dimming surface S32 to be totally reflected. The total reflection angle at the first dimming surface S32 is related to a refractive index of a material of the third optical element 3 and a refractive index of an external environment (which is generally air) where the third optical element 3 is placed. When the incident angle of the imaging light incident on the first dimming surface S32 is greater than the total reflection angle of the first dimming surface S32, the imaging light will be completely reflected. In this case, the fifth light incident surface S31 may be, for example, a free-form surface, so that a direction of the imaging light transmitted through the first dimming surface S32 may be adjusted. For another example, the first dimming surface S32 may be a free-form surface, and the incident angle of the imaging light being transmitted through the first dimming surface S32 may be adjusted, so that the imaging light may be completely reflected when being transmitted through the first dimming surface S32. The design principle of the free-form surface may be referred to the previous description, which will not be repeated here.

In addition, still referring to FIGS. 7 and 8, the fourth optical element 4 is disposed on a light exit path of the first second display module 201 in the at least one second display module 200. The fourth optical element 4 includes a sixth light incident surface S41, a second dimming surface S42, and a third light exit surface S43. The sixth light incident surface S41 is configured to transmit the imaging light emitted from the first second display module 201 into the fourth optical element 4. The second dimming surface S42 is configured to reflect the imaging light, which is transmitted into the fourth optical element 4 through the sixth light incident surface S41, onto the third light exit surface S43. The third light exit surface S43 is configured to transmit the imaging light reflected by the second dimming surface S42 onto the third light incident surface S21 of the second optical element 2. In this way, the light path of the imaging light emitted from the first second display module 201 may be modulated, so that the location of the first second display module 201 be flexibly set.

In some examples, at least one of the sixth light incident surface S41, the second dimming surface S42, and the third light exit surface S43 is a free-form surface. That is, any one or two of the sixth light incident surface S41, the second dimming surface S42, and the third light exit surface S43 are free-form surfaces, or all the three are free-form surfaces. For example, the fourth optical element 4 includes a fourth free-form surface prism 14, and the sixth light incident surface S41, the second dimming surface S42, and the third light exit surface S43 are three surfaces of the fourth free-form surface prism 14. For example, the sixth light incident surface S41, the second dimming surface S42, and the third light exit surface S43 may be three surfaces, which are sequentially connected end to end, of the fourth free-form surface prism 14. In this way, each surface of the fourth free-form surface prism 14 may be fully utilized, and the free-form surface may form a good modulation of the imaging light that is transmitted through the free-form surface, thereby improving the proportion of the imaging light that is emitted from the first second display module 201 and enters the first optical element 1 and the human eye 300, and finally enhancing the 3D display effect. The design principle of the free-form surface may be referred to the previous description, which will not be repeated here.

In some examples, the second dimming surface S42 may be, for example, a reflective mirror surface or set such that a total reflection angle at the second dimming surface S42 is smaller than or equal to a second preset angle, and the second preset angle is configured to cause the imaging light incident on the second dimming surface S42 to be totally reflected. A specific setting method of the second dimming surface S42 may be referred to the first dimming surface S32, which will not be repeated here. In this way, loss of the imaging light emitted from the second display module 200 and transmitted in the fourth optical element 4 may be reduced, and the 3D display effect may be further enhanced.

In some examples, as shown in FIG. 7, a light exit surface of the first first display module 101 may be obliquely disposed relative to the fifth light incident surface S31 of the third optical element 3. That is, an included angle between the imaging light emitted from the first first display module 101 and reaching the fifth light incident surface S31 and the first first display module 101 is an acute angle. Similarly, a light exit surface of the first second display module 201 may be also obliquely disposed relative to the sixth light incident surface S41 of the fourth optical element 4. In this way, the placement positions of the display modules in the optical system 10 may be diversified.

In some other examples, as shown in FIG. 8, the light exit surface of the first first display module 101 is opposite to the fifth light incident surface S31 of the third optical element 3. That is, an included angle between the imaging light emitted from the first first display module 101 and reaching the fifth light incident surface S31 and the first first display module 101 is approximately a right angle. For example, the included angle between the imaging light emitted from the first first display module 101 and reaching the fifth light incident surface S31 and the first first display module 101 is 85 degrees to 95 degrees. For example, the included angle between the imaging light emitted from the first first display module 101 and reaching the fifth light incident surface S31 and the first first display module 101 may be 85 degrees, 87 degrees, 90 degrees, 95 degrees, etc. In this way, the optical path difference of the imaging light emitted from different positions of the first first display module 101 to the fifth light incident surface S31 may be reduced. As a result, the display effect of the first first display module 101 may be improved. Similarly, the light exit surface of the first second display module 201 is opposite to the sixth light incident surface S41 of the fourth optical element 4. In this way, the optical path difference of the imaging light emitted from different positions of the first second display module 201 to the sixth light incident surface S41 may be reduced. As a result, the display effect of the first second display module 201 may be improved.

Figure 9:
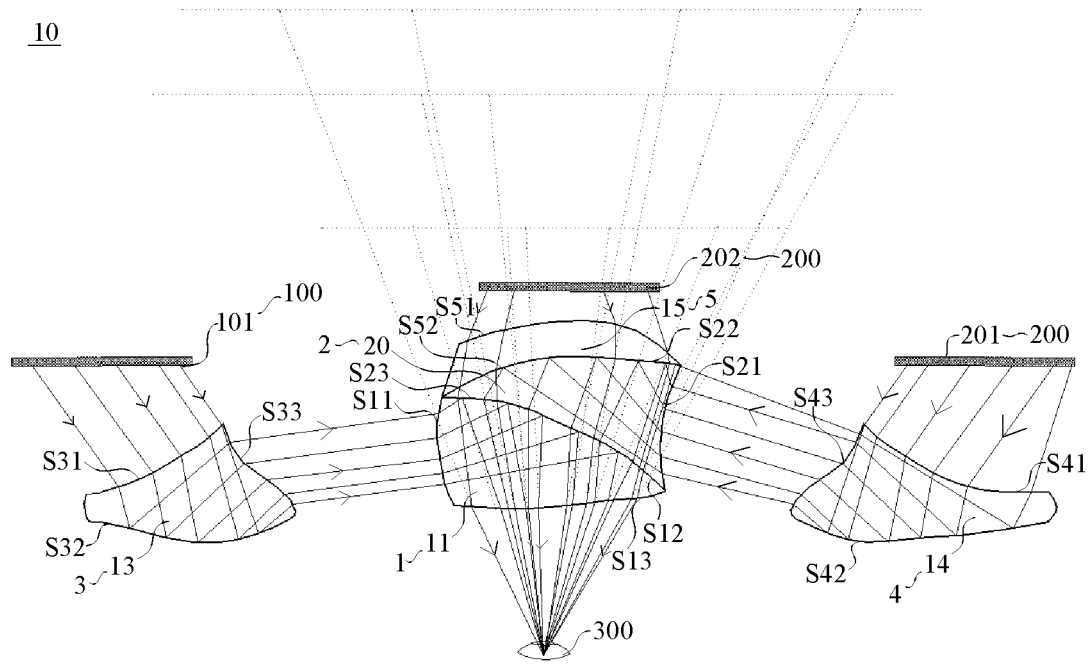
FIG. 9 is a diagram showing a structure of yet another optical system, in accordance with some embodiments.

In some embodiments, as shown in FIG. 9, the optical system 10 further includes a fifth optical element 5. The fifth optical element 5 is disposed on a light exit path of a second second display module 202 in the at least one second display module 200. The fifth optical element 5 includes a seventh light incident surface S51 and a fourth light exit surface S52. The seventh light incident surface S51 is configured to transmit the imaging light emitted from the second second display module 202 onto the fourth light exit surface S52 of the fifth optical element 5. The fourth light exit surface S52 is configured to transmit the imaging light transmitted through the fourth light exit surface S52 onto the fourth light incident surface S22 of the second optical element 2. In this way, the light emitted out of the second second display module 202 may be modulated to enter the second optical element 2 well.

In some examples, as shown in FIG. 9, any one or two of the seventh light incident surface S51 and the fourth light exit surface S52 are free-form surfaces. For example, the fifth optical element 5 includes a fifth free-form surface prism 15, and the seventh light incident surface S51 and the fourth light exit surface S52 are two surfaces of the fifth free-form surface prism 15. For example, a transition surface may be further disposed on a side of the seventh light incident surface S51, and opposite ends of the transition surface may be respectively connected to the seventh light incident surface S51 and the fourth light exit surface S52. The free-form surface may form a good modulation of the light that is transmitted through the free-form surface, thereby improving the proportion of the imaging light reaching the second light incident surface S12 of the first optical element 1, and finally enhancing the 3D display effect. The design principle of the free-form surface may be referred to the previous description, which will not be repeated here.

For example, the fourth light exit surface S52 may be in contact with the fourth light incident surface S22, so as to reduce a space occupied by the optical elements as a whole.

Figure 10:
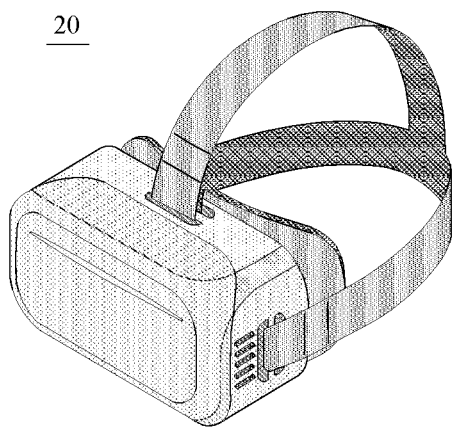
FIG. 10 is a diagram showing a structure of a display apparatus, in accordance with some embodiments.

Some embodiments of the present disclosure provide a display apparatus 20. As shown in FIG. 10, the display apparatus 20 includes the optical system 10 provided by any one of the above embodiments.

The display apparatus 20 may be, for example, any apparatus with a 3D display function, such as AR glasses, VR glasses, etc. The present disclosure does not specifically limit a specific use of the display apparatus 20.

Beneficial effects that may be achieved by the display apparatus 20 provided by some embodiments of the present disclosure are the same as the beneficial effects that achieved by the optical system 10, which will not be repeated here.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. An optical system, comprising:
   at least one first display module;
   at least one second display module; and
   a first optical element including a first light incident surface, a second light incident surface, and a viewing surface; the first light incident surface being disposed on a light exit path of the at least one first display module, and the second light incident surface being disposed on a light exit path of the at least one second display module, wherein
   the first light incident surface is configured to transmit imaging light emitted from the at least one first display module into the first optical element, and refract the imaging light emitted from the at least one first display module onto the second light incident surface;
   the second light incident surface is configured to transmit imaging light emitted from the at least one second display module into the first optical element, and refract the imaging light emitted from the at least one second display module onto the viewing surface, and reflect the imaging light, which is transmitted into the first optical element through the first light incident surface, onto the viewing surface;
   the viewing surface is configured to transmit imaging light emitted from the at least one first display module and the at least one second display module to a human eye, so as to form virtual images on different focal planes at a side of the viewing surface away from the human eye; and
   a second optical element including a third light incident surface and a first light exit surface; the third light incident surface being disposed on a light exit path of a first second display module in the at least one second display module, and the first light exit surface being disposed opposite to the second light incident surface of the first optical element, wherein
   the third light incident surface is configured to transmit imaging light emitted from the first second display module into the second optical element, and directly or indirectly transmit the imaging light emitted from the first second display module onto the first light exit surface; and the first light exit surface is configured to transmit imaging light incident onto the first light exit surface in the second optical element onto the second light incident surface of the first optical element.

2. The optical system according to claim 1, wherein at least one of the first light incident surface, the second light incident surface, and the viewing surface is a free-form surface.

3. The optical system according to claim 1, wherein the first optical element includes a first free-form surface prism, and the first light incident surface, the second light incident surface, and the viewing surface are three surfaces of the first free-form surface prism.

4. The optical system according to claim 1, wherein the second optical element further includes a fourth light incident surface, and the fourth light incident surface is configured to reflect the imaging light, which is transmitted into the second optical element through the third light incident surface, onto the first light exit surface.

5. The optical system according to claim 4, wherein at least one of the third light incident surface, the fourth light incident surface, and the first light exit surface is a free-form surface.

6. The optical system according to claim 4, wherein the second optical element includes a second free-form surface prism, and the third light incident surface, the fourth light incident surface, and the first light exit surface are three surfaces of the second free-form surface prism.

7. The optical system according to claim 4, wherein the at least one second display module further includes a second second display module, and the fourth light incident surface is disposed on a light exit path of the second second display module;
the fourth light incident surface is further configured to transmit imaging light emitted from the second second display module into the second optical element, and refract the imaging light emitted from the second second display module onto the first light exit surface.

8. The optical system according to claim 1, further comprising:
a third optical element disposed on a light exit path of a first first display module in the at least one first display module; the third optical element including a fifth light incident surface, a first dimming surface and a second light exit surface, wherein
the fifth light incident surface is configured to transmit imaging light emitted from the first first display module into the third optical element;
the first dimming surface is configured to reflect the imaging light, which is transmitted into the third optical element through the fifth light incident surface, onto the second light exit surface; and
the second light exit surface is configured to transmit the imaging light reflected by the first dimming surface onto the first light incident surface of the first optical element.

9. The optical system according to claim 8, wherein the first dimming surface is arranged in at least one of following ways:
a total reflection angle at the first dimming surface being smaller than or equal to a first preset angle, the first preset angle being configured to cause the imaging light incident on the first dimming surface to be totally reflected; or,
the first dimming surface being a reflective mirror surface.

10. The optical system according to claim 1, wherein the first light exit surface of the second optical element is in contact with the second light incident surface of the first optical element; or
the first light exit surface of the second optical element and the second light incident surface of the first optical element have a gap therebetween.

11. The optical system according to claim 1, further comprising:
at least one first polarization assembly, wherein each first polarization assembly is disposed on a light exit side of one corresponding first display module, and the first polarization assembly is configured to modulate imaging light emitted from the corresponding first display module into imaging light in a first polarization state;
at least one second polarization assembly, wherein each second polarization assembly is disposed on a light exit side of one corresponding second display module, and the second polarization assembly is configured to modulate imaging light emitted from the corresponding second display module into imaging light in a second polarization state; and
a polarization beam splitter disposed between the second light incident surface of the first optical element and the first light exit surface of the second optical element, wherein the polarization beam splitter is configured to reflect the imaging light in the first polarization state, and transmit the imaging light in the second polarization state.

12. The optical system according to claim 1, wherein a ratio of a reflectance to a transmittance of the second light incident surface is N to 1, and a ratio of display brightness of a first display module to display brightness of a second display module is 1 to N; N is greater than 0.

13. The optical system according to claim 1, wherein the second optical element further includes a fourth light incident surface; the at least one second display module further includes a second second display module; and the optical system further comprises:
a fifth optical element disposed on a light exit path of the second second display module;
the fifth optical element including a seventh light incident surface and a fourth light exit surface, wherein
the seventh light incident surface is configured to transmit imaging light emitted from the second second display module into the fifth optical element;
the fourth light exit surface is configured to transmit the imaging light transmitted through the seventh light incident surface onto the fourth light incident surface of the second optical element; and
the fourth light incident surface is configured to transmit the imaging light transmitted through the fourth light exit surface into the second optical element, and refract the imaging light transmitted through the fourth light exit surface onto the first light exit surface.

14. The optical system according to claim 1, wherein imaging light emitted from each display module of the at least one first display module and the at least one second display module has different optical paths to the viewing surface.

15. A display apparatus, comprising:
the optical system according to claim 1.

16. The display apparatus according to claim 15, wherein the apparatus includes virtual reality glasses or augmented reality glasses.

17. The optical system according to claim 1, further comprising:
- a fourth optical element disposed on the light exit path of the first second display module; the fourth optical element including a sixth light incident surface, a second dimming surface and a third light exit surface; wherein
- the sixth light incident surface is configured to transmit the imaging light emitted from the first second display module into the fourth optical element;
- the second dimming surface is configured to reflect the imaging light, which is transmitted into the fourth optical element through the sixth light incident surface, onto the third light exit surface; and
- the third light exit surface is configured to transmit the imaging light reflected by the second dimming surface onto the third light incident surface of the second optical element.

18. The optical system according to claim 17, wherein the second dimming surface is arranged in at least one of following ways:
- a total reflection angle at the second dimming surface being smaller than or equal to a second preset angle, the second preset angle being configured to cause the imaging light incident on the second dimming surface to be totally reflected; or
- the second dimming surface being a reflective mirror surface.

\* \* \* \* \*